April 18, 1933. A. OLEVIN 1,904,627
THREADLESS FITTING CONDUIT
Filed Nov. 24, 1931
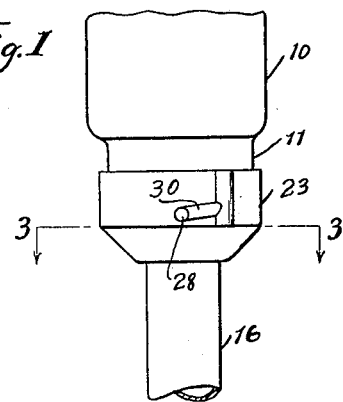
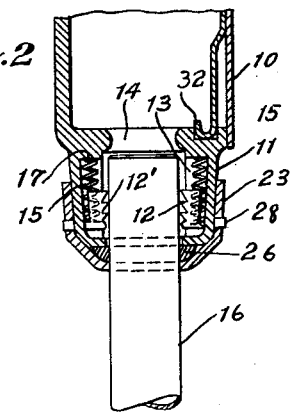
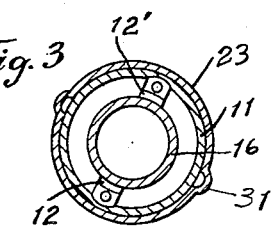
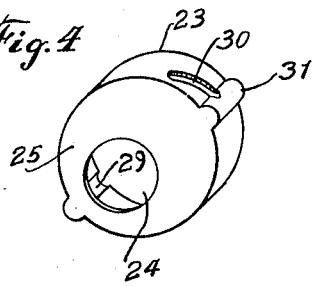
INVENTOR
Adolph Olevin
BY ATTORNEY Patented Apr. 18, 1933

1,904,627

UNITED STATES PATENT OFFICE

ADOLPH OLEVIN, OF BRONX, NEW YORK

THREADLESS FITTING CONDUIT

Application filed November 24, 1931. Serial No. 577,051.

This invention relates to improvements in connecting members, particularly to a means for connecting the sleeves or pipes of conduit fittings for electric and other cable connections.

In the old style conduit fittings the sleeves are threaded and require the use of threaded pipes.

My invention, which provides a threadless fitting, eliminates the necessity of threading the sleeves, as well as the pipes used with the same.

It is the principal object of my invention to provide such connecting means equipped with a spring within a chamber formed with one member having a wider and a narrower shouldered end, in which means are provided adapted to engage and firmly hold the other member of the connection when introduced into this chamber.

Another object of my invention is the provision of a simple and, therefore, inexpensive means, to effect the connection, which is strong and highly efficient in its operation.

Still another object of my invention is the provision of threadless fitting for the conduits of cable connections equipped with a means for making the connection watertight.

A further object of my invention is the provision of a connection for the ends of cables equipped with means for securely holding these ends in the connecting sleeve.

A still further object of my invention is the provision of a threadless fitting conduit having a screwless cover eliminating a great deal of labor and cost.

These and other objects and advantages of my invention will become more fully known as the description thereof proceeds, and will then be specifically defined in the appended claims.

In the accompanying drawing, forming a material part of this disclosure:

Fig. 1 is a side elevation of a connecting device constructed according to my invention.

Fig. 2 is a longitudinal section through the same.

Fig. 3 is a sectional view taken on line 3—3 of Figure 1.

Fig. 4 is a perspective view of the cover sleeve.

As illustrated, a sleeve 10 has a reduced neck part 11 formed therewith in which a chamber 13 is provided, wider at one of its ends and connected with the sleeve by an opening 14 and narrower at its opposite end. Spiral springs 15, 15', are provided in this chamber which are adapted to firmly engage threaded lugs 12, 12' with the end of a pipe stem 16 endwise introduced into chamber 13, while shoulders 17 are provided in chamber 13 to be engaged by the ends of the spring.

As shown, in Figures 3 and 4, the neck 11 is provided with a watertight cover comprising a sleeve 23 open at its inner end and provided with an opening 24 in its outer wall 25 allowing the passage of stem 16. A rubber washer 26 in said sleeve surrounds stem 16 and is held against the inner face of wall 25 between its flange 27 and the lower end of the neck part 11, as shown in Figure 3.

The sleeve 23 is held in position by means of pins 28 on the neck part entering grooves 29 in the inner wall of the sleeve at opposite points thereof and adjustable in a slot 30.

The sleeve has four abutments 31 formed at its outer periphery for the engagement of a suitable tool.

The operation of my device will be quite clear from the above description and by referring to the drawing.

After the cable ends are secured in their holder 32 the cover plate of sleeve 10 is secured and the end of pipe stem 16 through which one of the cables is introduced into sleeve 10 is introduced into the neck part 11 through its lower opening to be firmly engaged by the spring controlled lugs which, when the stem is withdrawn will engage in the narrower part of chamber 13, and be firmly wedged therein so as to prevent a withdrawal of stem 16, while the engagement of a suitable tool with abutments 31 will allow the removal of the stem 16 and allow the withdrawal of the same from the neck part 11.

It will be clear that the attachment of the sleeve 23 and its rotation to bring rubber gasket 26 about stem 16 into tight engagement with the neck part will produce a fluid tight closure at the lower end of the neck part.

It will be understood that I have disclosed the preferred form of my invention as an example only and that I may make such changes therein as come within the scope of the appended claims without departure from the spirit of my invention.

Having thus described my invention, what I claim as new and desire to secure by Letters Patent is:

1. A threadless fitting for the conduit of cable connections, as described, comprising a threadless sleeve, a neck part formed with said sleeve having an opening allowing the introduction of a cable, and having a chamber formed therein wider at one end than at the other, a threadless pipe-stem adapted to be entered through the opening in said neck part into said chamber, means in said chamber to snugly engage the end of said pipe stem and when drawn into the narrower part of said chamber to firmly hold the same in said chamber, a sleeve engaging said neck means for the engagement by tools to disengage said sleeve, means for said neck to disconnect stem and sleeve, and a fluid tight closure at the lower end of said chamber.

2. In a threadless fitting for the conduits of cable connections, the combination with a hollow threadless sleeve and means for holding the ends of cables therein, of a threadless pipe stem through which one cable is introduced into said sleeve, a neck formed with said sleeve having a chamber formed therein narrower at one end than at its other end, shoulders in said chamber, said neck part having an opening for the introduction of the pipe stem, springs in said chamber, lugs controlled by said springs, adapted to snugly engage the end of said pipe stem in said chamber and hold it therein by wedging it in the narrower part of said chamber, a sleeve for said neck part having an opening for the introduction of a cable and means for disengaging the same from said neck, said sleeve allowing the passage of said stem to be held in the neck part, and a rubber washer held in said sleeve to provide a fluid tight closure.

Signed at New York, in the county of New York and State of New York, this 14th day of November A. D. 1931.

ADOLPH OLEVIN.